(12) United States Patent
Kim et al.

(10) Patent No.: US 7,972,562 B2
(45) Date of Patent: *Jul. 5, 2011

(54) HIGH-PRESSURE FLUIDIZED BED REACTOR FOR PREPARING GRANULAR POLYCRYSTALLINE SILICON

(75) Inventors: Hee Young Kim, Daejeon (KR); Kyung Koo Yoon, Daejeon (KR); Yong Ki Park, Daejeon (KR); Won Choon Choi, Daejeon (KR)

(73) Assignee: Korea Research Institute of Chemical Technology, Daejeon (KR)

( * ) Notice: Subject to any disclaimer, the term of this patent is extended or adjusted under 35 U.S.C. 154(b) by 598 days.

This patent is subject to a terminal disclaimer.

(21) Appl. No.: 12/093,513

(22) PCT Filed: Feb. 7, 2007

(86) PCT No.: PCT/KR2007/000657
§ 371 (c)(1),
(2), (4) Date: May 13, 2008

(87) PCT Pub. No.: WO2007/091834
PCT Pub. Date: Aug. 16, 2007

(65) Prior Publication Data
US 2008/0267834 A1    Oct. 30, 2008

(30) Foreign Application Priority Data
Feb. 7, 2006    (KR) .................. 10-2006-0011493

(51) Int. Cl.
| | |
|---|---|
| *G05D 16/00* | (2006.01) |
| *B01J 19/00* | (2006.01) |
| *B01J 8/18* | (2006.01) |
| *F27B 15/08* | (2006.01) |
| *F27B 15/14* | (2006.01) |
| *F27B 15/16* | (2006.01) |
| *C01B 33/02* | (2006.01) |

(52) U.S. Cl. ........ 422/112; 422/129; 422/139; 422/140; 422/142; 422/143; 422/145; 423/348; 423/349

(58) Field of Classification Search .................. 422/110, 422/112, 129, 139, 140, 142, 143, 145, 146; 423/348, 349; 438/484, 687, 723
See application file for complete search history.

(56) References Cited

U.S. PATENT DOCUMENTS
4,786,477 A    11/1988    Yoon et al.
(Continued)

FOREIGN PATENT DOCUMENTS
DE    199 48 395 A    5/2001
(Continued)

*Primary Examiner* — Walter D Griffin
*Assistant Examiner* — Natasha Young
(74) *Attorney, Agent, or Firm* — Frommer Lawrence & Haug LLP; Ronald R. Santucci

(57) ABSTRACT

The present invention relates to a high-pressure fluidized bed reactor for preparing granular polycrystalline silicon, comprising (a) a reactor tube, (b) a reactor shell encompassing the reactor tube, (c) an inner zone formed within the reactor tube, where a silicon particle bed is formed and silicon deposition occurs, and an outer zone formed in between the reactor shell and the reactor tube, which is maintained under the inert gas atmosphere, and (d) a controlling means to keep the difference between pressures in the inner zone and the outer zone being maintained within the range of 0 to 1 bar, thereby enabling to maintain physical stability of the reactor tube and efficiently prepare granular polycrystalline silicon even at relatively high reaction pressure.

25 Claims, 2 Drawing Sheets

U.S. PATENT DOCUMENTS

| | | |
|---|---|---|
| 5,165,908 A | 11/1992 | Van Slooten et al. |
| 5,382,412 A | 1/1995 | Kim et al. |
| 5,810,934 A | 9/1998 | Lord et al. |
| 7,029,632 B1 * | 4/2006 | Weidhaus et al. .............. 422/139 |
| 7,771,687 B2 * | 8/2010 | Kim et al. ..................... 423/348 |
| 7,922,990 B2 * | 4/2011 | Hertlein et al. ............... 423/349 |
| 2009/0047204 A1 * | 2/2009 | Kim et al. ..................... 423/349 |
| 2010/0047136 A1 * | 2/2010 | Kim et al. ..................... 422/112 |
| 2010/0068116 A1 * | 3/2010 | Kim et al. ..................... 423/349 |

FOREIGN PATENT DOCUMENTS

| | | |
|---|---|---|
| WO | WO 96/41036 | 12/1996 |

* cited by examiner

HIGH-PRESSURE FLUIDIZED BED REACTOR FOR PREPARING GRANULAR POLYCRYSTALLINE SILICON

This application is a 371 of PCT/KR2007/000657 filed on Feb. 7, 2007, published on Aug. 16, 2007 under publication number WO 2007/091834 A1 which claims priority benefits from South Korean Patent Application Number 10-2006-0011493 filed Feb. 7, 2006, the disclosure of which is hereby incorporated by reference.

TECHNICAL FIELD

The present invention relates to a high-pressure fluidized bed reactor for preparing granular polycrystalline silicon that enables to maintain long-term stability of the reactor tube and efficiently prepare granular polycrystalline silicon even at relatively high reaction pressure.

BACKGROUND ART

Generally, high-purity polycrystalline silicon is used as a basic material for manufacturing semiconductor devices or solar cells. The polycrystalline silicon is prepared by thermal decomposition and/or hydrogen reduction of highly-purified silicon atom-containing reaction gas, thus causing the continuous silicon deposition on silicon particles.

For mass production of polycrystalline silicon, a bell-jar type reactor has been mainly used, which provides a rod-type polycrystalline silicon product with a diameter of about 50-300 mm. However, the bell-jar type reactor, which consists fundamentally of the electric resistance heating system, cannot be operated continuously due to inevitable limit in extending the maximum rod diameter achievable. This reactor is also known to have serious problems of low deposition efficiency and high electrical energy consumption because of limited silicon surfaces and high heat loss.

Alternatively, a fluidized bed reactor has recently been developed to prepare granular polycrystalline silicon with a size of 0.5-3 mm. According to this method, a fluidized bed of silicon particles is formed by the upward flow of gas and the size of the silicon particles increases as the silicon atoms deposit on the particles from the silicon atom-containing reaction gas supplied to the heated fluidized bed.

As in the conventional bell-jar type reactor, the fluidized bed reactor also uses a silane compound of Si—H—Cl system such as monosilane ($SiH_4$), dichlorosilane ($SiH_2Cl_2$), trichlorosilane ($SiHCl_3$), silicon tetrachloride ($SiCl_4$) or its mixture as the silicon atom-containing reaction gas, which usually further comprises hydrogen, nitrogen, argon, helium, etc.

For the silicon deposition, the reaction temperature (i.e., temperature of the silicon particles) should be maintained high. The temperature should be about 600-850° C. for monosilane, while being about 900-1,100° C. for trichlorosilane which is most widely used.

The process of silicon deposition, which is caused by thermal decomposition and/or hydrogen reduction of silicon atom-containing reaction gas, includes various elementary reactions, and there are complex routes where silicon atoms grow into granular particles depending on the reaction gas. However, regardless of the kind of the elementary reaction and the reaction gas, the operation of the fluidized bed reactor provides a granular polycrystalline silicon product.

Here, smaller silicon particles, i.e., seed crystals become bigger in size due to continuous silicon deposition or the agglomeration of silicon particles, thereby losing fluidity and ultimately moving downwards. The seed crystals may be prepared or generated in situ in the fluidized bed itself, or supplied into the reactor continuously, periodically or intermittently. Thus prepared bigger particles, i.e., polycrystalline silicon product may be withdrawn from the lower part of the reactor continuously, periodically or intermittently.

Due to the relatively high surface area of the silicon particles, the fluidized bed reactor system provides a higher reaction yield than that by the bell-jar type reactor system. Further, the granular product may be directly used without further processing for the following-up processes such as single crystal growth, crystal block production, surface treatment and modification, preparation of chemical material for reaction or separation, or molding or pulverization of silicon particles. Although these follow-up processes have been operated in a batchwise manner, the manufacture of the granular polycrystalline silicon allows the processes to be performed in a semi-continuous or continuous manner.

The increase in the productivity of the fluidized bed reactor is required for low-cost manufacture of granular polycrystalline silicon. For this purpose, it is most effective to increase the silicon deposition rate with low specific energy consumption, which is obtainable by continuous operation of the fluidized bed reactor under high pressure. For continuous operation of the process with the fluidized bed reactor, it is essential to secure the physical stability of the reactor components.

Unlike conventional fluidized bed reactors, serious limitations are encountered in material selection of the components of the fluidized bed reactor for preparing polycrystalline silicon. Especially, considering the desired high purity of the polycrystalline silicon, the material selection of the fluidized bed wall is important. The reactor wall is weak in physical stability because it is always in contact with silicon particles fluidizing at high temperatures, and is subject to the irregular vibration and severe shear stress caused by the fluidized bed of the particles. However, it is very difficult to select an appropriate material among the high-purity non-metallic inorganic materials that are capable of enduring a relatively high pressure condition, because metallic material is not appropriate because of high reaction temperature and chemical properties of the reaction gas. For this reason, the fluidized bed reactor for manufacture of polycrystalline silicon inevitably has a complicated structure. It is therefore common that a reactor tube made of quartz is positioned in an electrical resistance heater for heating the silicon particles, and both the reactor tube and the heater are surrounded by a metallic shell. It is preferred to fill an insulating material in between the heater and the reactor shell or outside the reactor shell to reduce heat loss.

For example, U.S. Pat. No. 5,165,908 discloses a reactor system where an electric resistance heater encloses a reactor tube made of quartz, both of which are protected by a jacket-shaped stainless-steel shell and an insulating material is installed outside the shell.

U.S. Pat. No. 5,810,934 discloses a fluidized bed reactor for manufacture of polycrystalline silicon, comprising a reactor vessel, i.e., the reactor tube defining a fluidized bed; a shroud, i.e., a protection tube surrounding the reactor tube; a heater installed outside the shroud; and an outer containment surrounding the heater and an insulating material. This patent emphasizes that the protection tube made of quartz be installed in between the reactor tube and the heater to prevent the crack of the reactor tube and the contamination of its inner space.

Meanwhile, the fluidized bed reactor for manufacture of polycrystalline silicon may have a different structure depending on the heating method.

For example, U.S. Pat. No. 4,786,477 discloses a method of heating silicon particles with microwave penetrating through the quartz reactor tube instead of applying a conventional heater outside the tube. However, this patent still has a problem of a complex structure of the reactor and fails to disclose how to increase the reaction pressure inside the quartz reactor tube.

To solve the above problem, U.S. Pat. No. 5,382,412 discloses a simple-structured fluidized bed reactor for manufacture of polycrystalline silicon, wherein a cylindrical reactor tube is hold vertically by a metallic reactor shell. However, this patent still has problems that the inner pressure cannot be increased beyond atmospheric pressure and the microwave supplying means should be combined with the reactor shell, thus failing to suggest how to overcome the mechanical weakness of the reactor tube that is anticipated at high-pressure reaction.

Therefore, in an embodiment of the present invention there is provided a high-pressure fluidized bed reactor for preparing granular polycrystalline silicon, which comprises (a) a reactor tube, (b) a reactor shell encompassing the reactor tube, (c) an inner zone formed within the reactor tube, where a silicon particle bed is formed and silicon deposition occurs, and an outer zone formed in between the reactor shell and the reactor tube, which is maintained under an inert gas atmosphere, and (d) a controlling means to keep the difference between pressures in the inner zone and the outer zone being maintained within the range of 0 to 1 bar, thereby enabling to maintain physical stability of the reactor tube and efficiently prepare granular polycrystalline silicon even at relatively high reaction pressure.

Further, in another embodiment of the present invention, there is provided a fluidized bed reactor that can be conveniently applicable to the manufacture of high-purity silicon particles while minimizing the impurity contamination.

DISCLOSURE OF INVENTION

According to one aspect of the present invention, there is provided a high-pressure fluidized bed reactor for preparing granular polycrystalline silicon, comprising:
(a) a reactor tube;
(b) a reactor shell encompassing the reactor tube;
(c) an inner zone formed within the reactor tube and an outer zone formed in between the reactor shell and the reactor tube, wherein a silicon particle bed is formed and silicon deposition occurs in the inner zone while a silicon particle bed is not formed and silicon deposition does not occur in the outer zone;
(d) an inlet means for introducing gases into the silicon particle bed;
(e) an outlet means comprising a silicon particle outlet means and a gas outlet means for discharging polycrystalline silicon particles and off-gas out of the silicon particle bed, respectively;
(f) an inert gas connecting means for maintaining a substantially inert gas atmosphere in the outer zone;
(g) a pressure controlling means for measuring and/or controlling the inner zone pressure (Pi) and the outer zone pressure (Po); and
(h) a pressure-difference controlling means for maintaining |Po−Pi| value in the range of 0-1 bar.

Referring to the Drawings herein, there is provided a detailed description of the present invention hereunder.

FIGS. 1 and 2 are cross-sectional views of the high-pressure fluidized bed reactor for preparing granular polycrystalline silicon, in which some of the embodiments according to the present invention are illustrated in a comprehensive way.

An inner space of the fluidized bed reactor here is separated from an outer space by a reactor shell 1 that surrounds a vertically-installed reactor tube 2. The reactor tube 2 partitions the inner space into an inner zone 4, where a silicon particle bed is formed and silicon deposition occurs, and an outer zone 5, where a silicon particle bed is not formed and silicon deposition does not occur.

The reactor shell 1 is preferred to be made of a metallic material with reliable mechanical strength and processability such as carbon steel, stainless steel or other alloy steel. The reactor shell 1 may be divided into a plurality of components such as 1a, 1b, 1c and 1d as set forth in FIGS. 1 and 2 for convenience in fabrication, assembly and disassembly.

It is important to assemble the components of the reactor shell 1 by using gaskets or sealing materials for complete sealing. The components may have various structures of a cylindrical pipe, a flange, a tube with fittings, a plate, a cone, an ellipsoid and a double-wall jacket with a cooling medium flowing in between the walls. The inner surface of each component may be coated with a protective layer or be installed with a protective tube or wall, which may be made of a metallic material or a non-metallic material such as organic polymer, ceramic and quartz.

Some of the components of the reactor shell 1, illustrated as 1a, 1b, 1c and 1d in FIGS. 1 and 2, are preferred to be maintained below a certain temperature by using a cooling medium such as water, oil, gas and air for protecting the equipment or operators, or for preventing any thermal expansion in equipment or a safety accident. Although not set forth in FIGS. 1 and 2, the components that need to be cooled are preferred to be designed to comprise a coolant-circulating means at their inner or outer walls. Instead of cooling, the reactor shell 1 may comprise an insulating material on the outer wall.

The reactor tube 2 may be of any shape only if it can be hold by the reactor shell 1 in such a manner that it can separate the inner space of the reactor shell 1 into an inner zone 4 and an outer zone 5. The reactor tube 2 may be of a structure of a simple straight tube as in FIG. 1, a shaped tube as in FIG. 2, a cone or an ellipsoid, and either one end or both ends of the reactor tube 2 may be formed into a flange shape. Further, the reactor tube 2 may comprise a plurality of components and some of these components may be installed in the form of a liner on the inner wall of the reactor shell 1.

The reactor tube 2 is preferred to be made of an inorganic material, which is stable at a relatively high temperature, such as quartz, silica, silicon nitride, boron nitride, silicon carbide, graphite, silicon, glassy carbon or their combination.

Meanwhile, a carbon-containing material such as silicon carbide, graphite, glassy carbon may generate carbon impurity and contaminate the polycrystalline silicon particles. Thus, if the reactor tube 2 is made of a carbon-containing material, the inner wall of the reactor tube 2 is preferred to be coated or lined with materials such as silicon, silica, quartz or silicon nitride. Then, the reactor tube 2 may be structured in a multi-layered form. Therefore, the reactor tube 2 is of one-layered or multilayered structure in the thickness direction, each layer of which is made of a different material.

Sealing means 41a, 41b may be used for the reactor shell 1 to safely hold the reactor tube 2. The sealing means are preferred to be stable at a temperature of above 200° C. and may be selected from organic polymer, graphite, silica, ceramic, metal or their combination. However, considering the vibration and thermal expansion during reactor operation, the sealing means 41a, 41b may be installed less firmly to lower the possibility of cracking of the reactor tube 2 in the course of assembly, operation and disassembly.

The partition of the inner space of the reactor shell 1 by the reactor tube 2 may prevent the silicon particles in the inner zone 4 from leaking into the outer zone 5 and differentiate the function and condition between the inner zone 4 and the outer zone 5.

In the meantime, a heating means 8a, 8b may be installed in the reactor shell 1 to heat silicon particles. One or a plurality of heating means 8a, 8b may be installed in the inner zone 4 and/or the outer zone 5 in various manner. For example, a heating means may be installed only in the inner zone 4 or in the outer zone 5 as illustrated in FIG. 1 in a comprehensive manner. Meanwhile, a plurality of heating means may be installed in both zones, or only in the outer zone 5 as illustrated in FIG. 2. Besides, although it is not illustrated in Drawings, a plurality of heating means 8a, 8b may be installed only in the inner zone 4. Otherwise, a single heating means may be installed in the outer zone 5 only.

The electric energy is supplied to the heating means 8a, 8b through an electric energy supplying means 9a-9f installed on or through the reactor shell 1. The electric energy supplying means 9a-9f, which connects the heating means 8a, 8b in the reactor and an electric source E outside the reactor, may comprise a metallic component in the form of a cable, a bar, a rod, a shaped body, a socket or a coupler. Otherwise the electric energy supplying means 9a-9f may comprise an electrode that is made of a material such as graphite, ceramic (e.g., silicon carbide), metal or a mixture thereof, and is fabricated in various shapes. Alternatively, the electric energy supplying means can be prepared by extending a part of the heating means 8a, 8b. In combining the electric energy supplying means 9a-9f with the reactor shell 1, electrical insulation is also important besides the mechanical sealing for preventing gas leak. Further, it is desirable to cool down the temperature of the electric energy supplying means 9 by using a circulating cooling medium such as water, oil and gas.

Meanwhile, a gas inlet means should be installed at the fluidized bed reactor to form a fluidized bed, where silicon particles can move by gas flow, within the reactor tube 2, i.e., in a lower part of the inner zone 4, for preparation of polycrystalline silicon by the silicon deposition on the surface of the fluidizing silicon particles.

The gas inlet means comprises a fluidizing gas inlet means 14, 14' for introducing a fluidizing gas 10 into the silicon particles bed and a reaction gas inlet means 15 for introducing a silicon atom-containing reaction gas, both of which are installed in combination with the reactor shell 1b.

As used herein, "a fluidizing gas" 10 refers to a gas introduced to cause some or most of the silicon particles 3 to be fluidized in the fluidized bed formed within the inner zone 4. In the present invention, hydrogen, nitrogen, argon, helium, hydrogen chloride (HCl), silicon tetrachloride (SiCl4) or a mixture thereof may be used as the fluidizing gas 10.

As used herein, "a reaction gas" 11 refers to a source gas containing silicon atoms, which is used to prepare the polycrystalline silicon particles. In the present invention, monosilane (SiH4), dichlorosilane (SiH2Cl2), trichlorosilane (SiHCl3), silicon tetrachloride (SiCl4) or a mixture thereof may be used as the reaction gas 11. The reaction gas 11 may further comprise at least one gas selected from hydrogen, nitrogen, argon, helium and hydrogen chloride (HCl). Further, in addition to serving as a source for silicon deposition, the reaction gas 11 contributes to the fluidization of the silicon particles 3 as the fluidizing gas 10 does.

The fluidizing gas inlet means 14, 14' and the reaction gas inlet means 15 may comprise a tube or nozzle, a chamber, a flange, a fitting, a gasket, etc, respectively. Among these components, the parts exposed to the inner space of the reactor shell 1, especially to the lower part of the inner zone 4, where the parts are likely to contact the silicon particles 3, are preferred to be made of a tube, a liner or a shaped article the material of which is selected from those applicable to the reactor tube 2.

Further, the lower part of the fluidized bed 4a in the inner zone 4 may comprise a gas distributing means 19 for distributing the fluidizing gas 10 in combination with the fluidizing gas inlet means 14, 14' and the reaction gas inlet means 15. The gas distributing means 19 may have any geometry or structure including a multi-hole or porous distribution plate, a packing filler material submerged in the particle bed, a nozzle or a combination thereof.

To prevent silicon deposition on the upper surface of the gas distributing means 19, the outlet of the reaction gas inlet means 15, through which a reaction gas 11 is injected into the interior of the fluidized bed, is preferred to be positioned higher than the upper part of the gas distributing means 19.

In the reactor inner zone 4, the fluidizing gas 10, which is required to form the fluidized bed 4a of silicon particles, may be supplied in various ways depending on how the fluidizing gas inlet means 14, 14' is constituted. For example, as illustrated in FIG. 1, the fluidizing gas 10 may be supplied by a fluidizing gas inlet means 14, 14' coupled with the reactor shell 1 so that a gas chamber may be formed in lower part of the distribution plate-shaped gas distributing means 19. Alternatively, as illustrated in FIG. 2, a fluidizing gas 10 may be supplied by a fluidizing gas inlet means 14 coupled with the reactor shell 1 so that one or a plurality of fluidizing gas nozzle outlet may be positioned in between the gas distributing means 19 that comprises a third packing filler material other than those fluidizing silicon particles. Meanwhile, the gas distributing means 19 and the fluidizing gas inlet means 14, 14' may be constituted by using both the distribution plate and the packing filler material.

In the present invention, the polycrystalline silicon particles are prepared in the inner zone 4 of the reactor based on the silicon deposition. Following the supply of the reaction gas 11 through the reaction gas inlet means 15, the silicon deposition occurs on the surface of the silicon particles 3 heated by the heating means 8a, 8b.

A particle outlet means 16 is also required to be combined with the reactor shell 1 to discharge thus prepared silicon particles from the inner zone 4 to the outside of the fluidized bed reactor.

An outlet pipe, which constitutes the particle outlet means 16, may be assembled with the reaction gas inlet means 15 as illustrated in FIG. 1. Alternatively, it may be installed independently of the reaction gas inlet means 15 as illustrated in FIG. 2. Through the particle outlet means 16 the silicon particles 3b may be discharged when required from the fluidized bed 4a in a continuous, periodic, or intermittent way.

As illustrated in FIG. 1, an additional zone may be combined with the reactor shell 1. The additional zone can be provided at some part or a lower part of the fluidizing gas inlet means 14', allowing a space for the silicon particles 3b to reside or stay with an opportunity of cooling before being discharged from the reactor.

Silicon particles 3, i.e., silicon particles 3 discharged from the inner zone 4 according to the present invention, may be delivered to a storage member or a transfer member of the polycrystalline silicon product, which is directly connected to the reactor. Meanwhile, thus-prepared silicon product particles 3b may have a particle-size distribution due to nature of the fluidized bed reactor, and smaller particles included therein may be used as seed crystals 3a for the silicon deposition. It is thus possible that the silicon product particles 3b discharged from the inner zone 4 may be delivered to a particle separation member where the particles can be separated by size. Then the larger particles may be delivered to the storage member or the transfer member, while the smaller particles are used as seed crystals 3a.

Otherwise, considering the relatively high-temperature of the silicon particle fluidized bed 4a, the silicon particles 3b are preferred to be cooled down while being discharged through the particle outlet means 16. For this purpose, a cooling gas such as hydrogen, nitrogen, argon, helium, or a mixture thereof may flow in the particle outlet means 16, or a cooling medium such as water, oil or gas may be circulated through the wall of the particle outlet means 16.

Alternatively, although it is not illustrated in Drawings, the particle outlet means 16 may be constituted in combination with the inner space of the reactor shell 1 (e.g. 14' in FIG. 1) or a lower part of the reactor shell (e.g., 1b in FIGS. 1 and 2), allowing a sufficient space for the silicon particles 3b to reside or stay with an opportunity of cooling for a certain period of time before being discharged from the reactor.

It is necessary to prevent the silicon product particles 3b from being contaminated while discharged from the reactor through the particle outlet means 16. Therefore, in constituting the particle outlet means 16, the elements that may contact high-temperature silicon product particles 3b may be made of a tube, a liner or a shaped product that is made of or coated with an inorganic material applicable to the reactor tube 2. These elements of the particle outlet means 16 are preferred to be coupled to the metallic reactor shell and/or a protection pipe.

The components of the particle outlet means 16, which are in contact with the relatively low-temperature product particles or comprise a cooling means on their wall, may be made of a metal-material tube, a liner or a shaped product, the inner wall of which is coated or lined with a fluorine-containing polymer material.

As mentioned above, the silicon product particles 3b may be discharged from the reactor inner zone 4 through the particle outlet means 16 to a storage member or a transfer member of the polycrystalline silicon product in a continuous, periodic, or intermittent way.

Meanwhile, a particle separation member may be installed in between the reactor and the product storage member, to separate the silicon product particles 3b by size and use small-sized particles as seed crystals 3a. Various commercial devices may be used as the particle separation member in the present invention.

It is desirable to constitute the elements of the particle separation member, which may be in contact with the silicon product particles 3b, by using the same material as the one used in the particle outlet means 16, or pure polymer material that does not contain either an additive or a filler.

For continuous operation of the fluidized bed reactor, it is necessary to combine the reactor shell 1d with a gas outlet means 17 which is installed for discharging the off-gas from the fluidized bed reactor. The off-gas 13 comprises a fluidizing gas, a non-reacted reaction gas and a product gas, and passes through the upper part of the inner zone, 4c.

Fine silicon particles or high-molecular-weight byproducts entrained in the off-gas 13 may be separated from an additional off-gas treating means 34.

As illustrated in FIGS. 1 and 2, an off-gas treating means 34, which comprises a cyclone, a filter, a packed column, a scrubber or a centrifuge, may be installed outside the reactor shell 1 or at the upper zone 4c of the inner zone within the reactor shell 1.

Fine silicon particles, thus separated from the off-gas treating means 34, may be used for another purpose, or as seed crystals 3a for preparing silicon particles after being recycled into the fluidized bed 4a at the inner zone of the reactor.

When manufacturing silicon particles in a continuous manner, it is preferred to maintain the number and the average particle size of the silicon particles, which forms the fluidized bed 4a, within a certain range. This may be obtained by supplementing nearly the same number of the seed crystals within the fluidized bed 4a as that of the discharged silicon product particles 3b.

As mentioned above, the fine silicon particles or powders separated from the off-gas treating means 34 may be recycled as seed crystals, but their amount can not be sufficient. It is then required to further yield, generate or prepare additional silicon seed crystals for continuous preparation of the silicon particles as required in the fluidized bed.

In this regard, it may be considered to further separate the smaller silicon particles among the silicon product particles 3b and use them as seed crystals 3a. However, the additional process for separating seed crystals 3a from the product particles 3b outside the fluidized bed reactor has drawbacks of high chances of contamination and difficulties in operation.

Instead of the additional separation of product particles 3b, it is also obtainable to cool silicon product particles 3b, to separate smaller particles out of them and to recycle the smaller particles as seed crystals into the fluidized bed. To this purpose an additional particle separation member may be installed in the middle of a discharge path included in the particle outlet means 16. Supplying a gas into the pathway in a counter-current manner leads to cooling of the product particles 3b, separation of smaller particles out of them and recycling of the smaller particles into the fluidized bed 4a. This reduces the burden of preparing or supplying seed crystals, and increases the average particle size of the final silicon product particles 3b while decreasing their particle size distribution.

As another embodiment, the silicon seed crystals may be prepared by pulverizing some of silicon product particles 3b discharged through the particle outlet means 16 into seed crystals in a separate pulverizing apparatus. Thus prepared seed crystals 3a may be introduced into the inner zone 4 of the reactor in a continuos, periodic or intermittently way as required. One example when seed crystals 3a is downwardly introduced into the inner zone 4 is illustrated in FIG. 1, where a seed crystals inlet means 18 is combined with the topside of the reactor shell 1d. This method allows an efficient control in the average size and the feeding rate of seed crystals 3a as required, while it has a drawback of requiring a separate pulverizing apparatus.

On the contrary, silicon particles may be pulverized into seed crystals inside fluidized bed 4a by using an outlet nozzle of a reaction gas inlet means 15 combined with the reactor shell or an additionally installed gas nozzle for a high-speed gas jet inside the fluidized bed allowing particle pulverization. This method has an economic advantage because it needs no additional pulverizing device, while having a drawback that it is difficult to control the size and generation amount of the seed crystals in the reactor within a predetermined acceptable range.

In the present invention, the inner zone 4 comprises all spaces required for forming a silicon particle bed 4a, supplying a fluidizing gas 10 and a reaction gas 11 into the silicon particle bed 4a, allowing silicon deposition, and discharging the off-gas 13 containing a fluidizing gas, a non-reacted reaction gas and a byproduct gas. Therefore, the inner zone 4 plays a fundamental role for silicon deposition in the fluidized bed of silicon particles 3 and preparation of polycrystalline silicon product particles.

In contrast to the inner zone 4, the outer zone 5 is an independently formed space in between outer wall of reactor tube 2 and reactor shell 1, where a silicon particle bed 3 is not formed and silicon deposition does not occur due to no supply of the reaction gas.

According to the present invention, the outer zone 5 also plays important roles as follows. First, the outer zone 5 provides a space for protecting the reactor tube 2 by maintaining pressure difference between the inner zone 4 and the outer zone 5 within a certain range.

Second, the outer zone 5 provides a space for installing an insulating material 6 that prevents or decreases heat loss from the reactor.

Third, the outer zone 5 provides a space for a heater to be installed around the reactor tube 2.

Fourth, the outer zone 5 provides a space for maintaining a substantially inert gas atmosphere outside the reactor tube 2 to prevent dangerous gas containing oxygen and impurities from being introduced into the inner zone 4, and for safely installing and maintaining the reactor tube 2 inside the reactor shell 1.

Fifth, the outer zone 5 allows a real-time monitoring of the status of the reactor tube 2 during operation. The analysis or measurement of the outer-zone gas sample from the outer zone connecting means 28 may reveal the presence or concentration of a gas component that may exist in the inner zone 4, the change of which may indirectly reveal an accident at the reactor tube.

Sixth, the outer zone 5 provides a space for installing a heater 8b surrounding the reactor tube 2, as illustrated in FIG. 2, for heating up and chemically removing the silicon deposit layer accumulated on the inner wall of the reactor tube 2 due to silicon deposition operation.

Seventh, the outer zone 5 provides a space required for efficiently assemblying or disassemblying the reactor tube 2 and the inner zone 4.

According to the present invention, the outer zone 5 plays various important roles as mentioned above. Thus, the outer zone may be partitioned into several sections in an up-and-down and/or a radial or circumferential direction, utilizing one or more of tubes, plates, shaped articles or fittings as partitioning means.

When the outer zone 5 is further partitioned according to the present invention, the divided sections are preferred to be spatially communicated with each other while having substantially the same atmospheric condition and pressure.

An insulating material 6, which may be installed in the outer zone 5 for greatly reducing heat transfer via radiation or conduction, may be selected from industrially acceptable inorganic materials in the form of a cylinder, a block, fabric, a blanket, a felt, a foamed product, or a packing filler material.

The heating means 8a, 8b, connected to an electric energy supplying means 9, which is connected to the reactor shell for maintaining reaction temperature in the fluidized bed reactor, may be installed in the outer zone 5 only, or installed alone within the inner zone 4, especially within the silicon particle bed 4a. The heating means 8a, 8b, may be installed in both the inner zone 4 and the outer zone 5, if required, as illustrated in FIG. 1. FIG. 2 illustrates an example when a plurality of independent heating means 8a, 8b are installed in the outer zone 5.

When a plurality of heating means 8a, 8b are installed in the fluidized bed reactor, they may be electrically connected in series or parallel relative to an electric source E. Alternatively, the power supplying system comprising an electric source E and an electric energy supplying means 9a-9f may be constituted independently as illustrated in FIGS. 1 and 2.

As illustrated in FIG. 1, the heater 8a installed within the silicon particle bed 4a may have an advantage of directly heating silicon particles in the fluidized bed. In this case, to prevent accumulative silicon deposition on the surface of the heater 8a, the heater 8a is preferred to be positioned lower than the reaction gas outlet of a reaction gas inlet means 15.

In the present invention, an inert gas connecting means 26a, 26b is installed on the reactor shell, independently of the inner zone 4, to maintain a substantially inert gas atmosphere in the outer zone 5 precluding silicon deposition. The inert gas 12 may be one or more selected from hydrogen, nitrogen, argon and helium.

An inert gas connecting means 26a, 26b, which is installed on or through the reactor shell and spatially connected to the outer zone 5, has the function of piping connection for supplying or discharging an inert gas 12, and may be selected from a tube, a nozzle, a flange, a valve, a fitting or their combination.

Meanwhile, apart from the inert gas connecting means 26a, 26b, a reactor shell, which is spatially exposed to the outer zone 5 directly or indirectly, may be equipped with an outer zone connecting means 28. Then, the outer zone connecting means 28 may be used to measure and control temperature, pressure or gas component. Although even a single inert gas connecting means 26a, 26b may allow to maintain a substantially inert gas atmosphere in the outer zone 5, the supply or discharge of an inert gas may be independently performed by using a double-pipe or a plurality of inert gas connecting means 26a, 26b.

Further, the inert gas connecting means 26a, 26b maintains an independent inert gas atmosphere in the outer zone 5, and may also be used for measuring and/or controlling flow rate, temperature, pressure or gas component, which can also be performed by using the outer zone connecting means 28.

FIGS. 1 and 2 provide various examples in a comprehensive way where pressure (Po) in the outer zone 5 is measured or controlled by using the inert gas connecting means 26a, 26b or outer zone connecting means 28.

The outer zone connecting means 28 may be installed to measure and/or control the maintenance of the outer zone 5, independently of or on behalf of the inert gas connecting means 26a, 26b. The outer zone connecting means 28 has the function of piping connection, and may be selected from a tube, a nozzle, a flange, a valve, a fitting or their combination. If the inert gas connecting means 26a, 26b is not installed, the outer zone connecting means 28 may be used to supply or discharge an inert gas 12 as well as to measure or control temperature, pressure or gas component. Therefore, it is not necessary to differentiate the inert gas connecting means 26a, 26b from the outer zone connecting means 28 in respect of shape and function.

Unlike the outer zone 5, where pressure may be maintained nearly constant irrespective of position and time, there exists inevitably a pressure difference within the inner zone 4 according to the height of the fluidized bed 4a of silicon particles 3. Thus, pressure (Pi) in the inner zone 4 changes according to the height in the inner zone 4.

Although the pressure drop imposed by the fluidized bed of solid particles depends on the height of the fluidized bed, it is common to maintain the pressure drop by fluidized bed less than about 0.5-1 bar unless the height of the fluidized bed is excessively high. Further, irregular fluctuation of the pressure is inevitable with time due to the nature of the fluidization of solid particles. Thus, pressure may vary in the inner zone 4 depending on position and time.

Considering these natures, the pressure controlling means for the inner pressure, i.e., the inner pressure controlling means 30 for directly or indirectly measuring or controlling pressure (Pi) in the inner zone 4 may be installed at such a point among various positions that it may be spatially connected to the inner zone 4.

Pressure controlling means according to the present invention, i.e., the inner pressure controlling means 30 and the outer pressure controlling means 31 may be installed on or through various positions depending on the details of the reactor assembly as well as on the operational parameters to be controlled.

The pressure controlling means for the inner pressure, i.e., the inner pressure controlling means 30 may be spatially connected to the inner zone 4 through an inner zone connecting means 24, 25, a fluidizing gas inlet means 14, a reaction gas inlet means 15, a particle outlet means 16, or a gas outlet means 17, which are spatially exposed directly or indirectly to the inner zone 4.

Meanwhile, the pressure controlling means for the outer pressure, i.e., the outer pressure controlling means 31 may be spatially connected to the outer zone 5 through an outer zone connecting means 28 or an inert gas connecting means 26a, 26b, etc., which are installed on or through the reactor shell 1 and spatially exposed directly or indirectly to the outer zone 5.

According to a preferable embodiment of the present invention, the inner pressure controlling means 30 and outer pressure controlling means 31 comprise the components necessary for directly or indirectly measuring and/or controlling pressure.

Either of the pressure controlling means, 30 and 31, comprises at least one selected from the group consisting of: (a) a connecting pipe or fitting for spatial connection; (b) a manually-operated, semi-automatic, or automatic valve; (c) a digital- or analog-type pressure gauge or pressure-difference gauge; (d) a pressure indicator or recorder; and (e) an element constituting a controller with a signal converter or an arithmetic processor.

The pressure controlling means for the inner pressure, 30, is interconnected with the pressure controlling means for the outer pressure, 31, in the form of a mechanical assembly or a signal circuit. Further, either of the pressure controlling means may be partially or completely integrated with a control system selected from the group consisting of a central control system, a distributed control system and a local control system.

Although the inner pressure controlling means 30 and outer pressure controlling means 31 may be independently constituted in terms of pressure, either of the pressure controlling means may be partially or completely integrated with a means for measuring or controlling a parameter selected from the group consisting of flow rate, temperature, gas component and particle concentration, and etc.

Meanwhile, either of the controlling means, 30 or 31, may further comprise a separation device such as a filter or a scrubber for separating particles, or a container for buffering pressure. This protects the component of the pressure controlling means from contamination by impurities, and also provides a means to buffer pressure changes.

As an example, the inner pressure controlling means 30 may be installed at or connected to the inner zone connecting means 24, 25, which is installed on or through the reactor shell and is spatially exposed directly or indirectly to an inner zone 4 for measurement of pressure, temperature or gas component or for viewing inside the reactor. By constructing the inner pressure controlling means 30 so that it may be connected to the inner zone connecting means 24, 25, pressure in upper part of the inner zone 4c may be stably measured and/or controlled although it is difficult to detect the time-dependent pressure fluctuation due to the fluidized bed of silicon particles. For more accurate detection of the time-dependent pressure fluctuation related with the fluidized bed, the inner zone connecting means may be installed so that it may be spatially connected to the inside of the fluidized bed. The inner pressure controlling means 30 may also be installed at or connected to other appropriate positions, i.e., a fluidizing gas inlet means 14 or a reaction gas inlet means 15 or a particle outlet means 16 or a gas outlet means 17, etc., all of which are combined with the reactor shell thus being spatially connected to the inner zone 4.

Further, a plurality of inner pressure controlling means 30 may be installed at two or more appropriate positions which ultimately allow spatial connection with the inner zone 4 through the inner zone connecting means 24, 25 or those at other positions (14, 15, 16, 17).

As mentioned above, the presence of silicon particles affects the inner pressure, Pi. Thus, the measured value of Pi varies according to the position where the inner pressure controlling means 30 is installed. Following observations by the present inventors, the value of Pi is influenced by the characteristics of the fluidized bed and by the structure of a fluidizing gas inlet means 14 or a reaction gas inlet means 15 or a particle outlet means 16 or a gas outlet means 17, but its positional deviation according to pressure measurement point is not greater than 1 bar.

As a preferred embodiment, the outer pressure controlling means 31, for directly or indirectly measuring and/or controlling pressure in the outer zone 5, is preferred to be installed so that it may be spatially connected to the outer zone 5. The position where the outer pressure controlling means 31 may be connected or installed includes, for example, an outer zone connecting means 28 or an inert gas connecting means 26a, 26b installed on or through the reactor shell, which is spatially connected to the outer zone 5 directly or indirectly. In the present invention, the outer zone 5 is preferred to be maintained under a substantially inert gas atmosphere. Thus, the outer zone connecting means 28 may also comprise the function of an inert gas connecting means 26a that may be used for introducing an inert gas 12 to the outer zone 5 or an inert gas connecting means 26b that may be used for discharging an inert gas 12 from the outer zone 5. Therefore, it is possible to spatially connect the outer zone 5 to the outer pressure controlling means 31 for directly or indirectly measuring and/or controlling pressure in the outer zone 5 through an inert gas connecting means 26a, 26b or an outer zone connecting means 28.

In the present invention, the inner pressure controlling means 30 and the outer pressure controlling means 31 may be used to maintain the value of |Po−Pi|, i.e. the difference between the pressure in the inner zone 4 (Pi) and that in the outer zone 5 (Po) within 1 bar. However, it should be noted in constituting the inner pressure controlling means 30 that Pi may vary depending on the position selected for connection to the inner zone.

The value of Pi measured through an inner zone connecting means 24, 25, a fluidizing gas inlet means 14, a reaction gas inlet means 15, or a particle outlet means 16, etc., which are installed at the positions spatially connected to an inner or lower part of the fluidized bed, is higher than the value of Pi measured through an inner zone connecting means, a gas outlet means 17 or silicon seed crystals inlet means 18, etc., which are installed at the positions spatially connected to a space like an upper part of the inner zone 4c and are not in direct contact with the fluidized bed of silicon particles.

Especially, the pressure value, measured through an inner zone connecting means, a fluidizing gas inlet means 14 or a particle outlet means 16, which is spatially connected to a lower part of the fluidized bed of silicon particles, shows a maximum inner pressure value, $Pi_{max}$. On the contrary, a minimum inner pressure value, $Pi_{min}$, may be obtained when measured through a gas outlet means 17 or an inner zone connecting means 24, 25, which is not in direct contact with the fluidized bed. This is because there is a pressure difference depending on the height of the fluidized bed of silicon particles 4a and the value of Pi is always higher in the lower part as compared to the upper part of the fluidized bed.

This pressure difference increases with the height of the fluidized bed. An excessively high bed with the pressure difference being 1 bar or higher is not preferred because the height of the reactor becomes too high to be used. In contrast, a very shallow bed with the pressure difference of 0.01 bar or lower is not preferred either, because the height and volume of the fluidized bed is too small to achieve an acceptable minimum productivity of the reactor.

Therefore, the pressure difference in the fluidized bed is preferred to be within the range of 0.01-1 bar. That is, pressure differences between maximum pressure value ($Pi_{max}$) and minimum pressure value ($Pi_{min}$) in the inner zone 4 is preferred to be within 1 bar.

When maintaining the value of |Po−Pi|, i.e. pressure difference between inside and outside the reactor tube 2 within the range of 0 to 1 bar, it should be noted that the pressure difference may vary depending on the height of the reactor tube 2.

It is preferred to meet the requirements of Po≦Pi and 0 bar≦(Pi−Po)≦1 bar, when the inner pressure controlling means 30 is spatially connected to the inner zone 4 through an inner zone connecting means, a fluidizing gas inlet means 14, a reaction gas inlet means 15 or a particle outlet means 16, etc., which is connected to an inner or lower part of the fluidized bed of silicon particles, the pressure of which is higher than that of the upper part of the inner zone 4c.

In contrast, it is preferred to meet the requirements of Pi≦Po and 0 bar≦(Po−Pi)≦1 bar, when the inner pressure controlling means 30 is spatially connected to the inner zone 4 through a gas outlet means 17, a silicon seed crystals inlet means 18, or an inner zone connecting means 24, 25, etc., which is not spatially connected to the fluidized bed of silicon particles but connected to an upper part of the inner zone 4c, the pressure of which is lower than that of the inner or lower part of the fluidized bed.

It may also be permissible to constitute the inner pressure controlling means 30 or the outer pressure controlling means 31 in such manner that Pi or Po is represented by an average of a plurality of pressure values measured at one or more positions. Especially, because there may be pressure difference in the inner zone 4 depending on the connection position, the inner pressure controlling means 30 may comprise a controlling means with an arithmetic processor that is capable of estimating an average value of pressure from those values measured with two or more pressure gauges.

Therefore, when maintaining the value of |Po−Pi|, i.e., the pressure difference value between inside and outside the reaction tube, within 1 bar, it is preferred to maintain the pressure value at outer zone 5, Po, in between $Pi_{max}$ and $Pi_{min}$, which are maximum and minimum values, respectively, that can be measured by the spatial connection of those pressure controlling means to the inner zone 4.

The inner pressure controlling means 30 and/or outer pressure controlling means 31 according to the present invention should comprise a pressure-difference controlling means that maintains the value of |Po−Pi| within 1 bar.

The pressure-difference controlling means may be comprised in only one of the inner pressure controlling means 30 or the outer pressure controlling means 31, or in both of the controlling means independently, or in the two controlling means 30, 31 in common.

However, it is preferred to apply and maintain a pressure-difference controlling means with consideration that pressure value varies depending on the position selected for measuring the pressure at the inner zone 4, Pi. When Pi is measured through a fluidizing gas inlet means 14, a reaction gas inlet means 15, a particle outlet means 16, or an inner zone connecting means, etc., which are spatially connected to inner part of the fluidized bed, especially to the lower part of the fluidized bed, where the pressure is higher than that in an upper part of the inner zone 4c, the pressure-difference controlling means may preferably be operated so that the requirements of Po≦Pi and 0 bar≦(Pi−Po)≦1 are satisfied. Then, the pressure-difference controlling means enables the outer zone pressure (Po) and inner zone pressure (Pi) to satisfy the requirement of 0 bar≦(Pi−Po)≦1 bar, with the inner pressure controlling means 30 being spatially connected to an inner part of the fluidized bed through a fluidizing gas inlet means 14 or a reaction gas inlet means 15 or a particle outlet means 16 or an inner zone connecting means.

In contrast, it is preferred to apply and maintain a pressure-difference controlling means so that the requirements of Pi≦Po and 0 bar≦(Po−Pi)≦1 bar may be satisfied if Pi is measured at a position that is spatially connected to the upper part of the inner zone 4c among various parts of the inner zone 4. Then, the pressure-difference controlling means enables the requirement of 0 bar≦(Po−Pi)≦1 bar to be satisfied, with the inner pressure controlling means 30 being spatially connected to the inner zone 4 through a gas outlet means 17, a silicon seed crystals inlet means 18, or an inner zone connecting means 24, 25, which are not in direct contact with the fluidized bed of silicon particles.

In the present invention, being comprised in only one of the inner pressure controlling means 30 or the outer pressure controlling means 31, in both of the two controlling means 30, 31 independently, or in the two controlling means 30, 31 in common, the pressure-difference controlling means maintains the value of |Po−Pi| within 1 bar.

When the difference between Po and Pi is maintained within 1 bar by using the pressure difference controlling means, very high or low values of Pi or Po do not influence on the reactor tube 2 because the pressure difference is small between the inner zone and the outer zone of the reactor tube 2.

It is preferred in terms of productivity to maintain the reaction pressure higher than at least 1 bar instead at a vacuum state less than 1 bar, if pressure is expressed in absolute unit in the present invention.

The feeding rates of fluidizing gas 10 and reaction gas 11 increase with pressure in a nearly proportional manner, based on mole number or mass per unit time. Thus, the heat duty in the fluidized bed 4a for heating the reaction gas from an inlet temperature to the temperature required for reaction also increases with the reaction pressure, i.e., Po or Pi.

In case of the reaction gas 11, it is impossible to supply the gas into the reactor after preheating up to higher than about 350-400° C., i.e. incipient decomposition temperature.

Meanwhile, it is inevitable to preheat the fluidizing gas 10 up to lower than the reaction temperature because impurity contamination is highly probable during a preheating step outside the fluidized bed reactor, and the fluidizing gas inlet means 14 can hardly be insulated to achieve a gas preheating to above the reaction temperature. Therefore, difficulties in heating increase with pressure. When the reaction pressure exceeds about 15 bar, it is difficult to heat the fluidized bed 4a as required although a plurality of heating means 8a, 8b are additionally installed at the inner space of the reactor shell. Considering these practical limitations, the pressure in the outer zone 5 (Po) or the pressure in the inner zone 4 (Pi) is preferred to be within about 1-15 bar based on the absolute pressure.

According to the pressure within the reactor, the inner pressure controlling means 30 and/or the outer pressure controlling means 31 may comprise a pressure-difference controlling means that can reduce the pressure difference between inside and outside the reactor tube 2. This can be practised in various ways, some examples of which are described hereinafter.

The reaction pressure may be set to a high level by using the pressure-difference controlling means without deteriorating the stability of the reactor tube 2, thus enabling to increase both the productivity and stability of the fluidized bed reactor.

For example, irrespective of the position of installation of the inner pressure controlling means 30 for ultimate connection to the inner zone 4, both of the inner pressure controlling means 30 and the outer pressure controlling means 31 may comprise respective pressure-difference controlling means so that the inner pressure (Pi) at the inner zone 4 and the outer pressure (Po) at the outer zone 5 may be controlled at predetermined values of pressure, i.e. Pi* and Po*, respectively, satisfying the requirement of $|Po^*-Pi^*| \leq 1$ bar.

For this purpose, the inner pressure controlling means 30 may comprise a pressure-difference controlling means that maintains Pi at a predetermined value, Pi*. At the same time, the outer pressure controlling means 31 may also comprise a pressure-difference controlling means that maintains Po at such a predetermined value, Po*, that the requirement of $|Po^*-Pi^*| \leq 1$ bar is satisfied independently of the height. Likewise, the outer pressure controlling means 31 may comprise a pressure-difference controlling means that maintains Po at a predetermined value, Po*. At the same time, the inner pressure controlling means 30 may also comprise a pressure-difference controlling means that maintains Pi at such a predetermined value, Pi*, that the requirement of $|Po^*-Pi^*| \leq 1$ bar is satisfied independently of the height.

As an another embodiment, irrespective of the position of installation of the inner pressure controlling means 30 for ultimate connection to the inner zone 4, the inner pressure controlling means 30 may comprise a pressure-difference controlling means that maintains Pi at a predetermined value, Pi*, while the outer pressure controlling means 31 may comprise a pressure-difference controlling means that controls the outer pressure, Po, in accordance with the change of the real-time inner pressure so that the requirement of $|Po-Pi| \leq 1$ bar is satisfied independently of the height.

Meanwhile, when determining the values of the control parameters, Pi* and Po*, which are predetermined for maintaining the difference between Po and Po within 1 bar, it may be necessary to consider whether or not impurity components can possibly migrate through a sealing means 41a, 41b of reactor tube 2.

In assemblying the fluidized bed ractor for operation according to the present invention, there exists a practical limit that a sufficient degree of gas-tight sealing may not be obtainable at sealing means 41a, 41b for reactor tube 2. Further, its degree of sealing can be reduced by the shear stress imposed on reactor tube 2 due to fluidization of silicon particles 3. In the present invention, the problem of possible migration of impurity components between the inner zone 4 and the outer zone 5 through the sealing means 41a, 41b may be solved by properly presetting the values of control parameters, i.e., Pi* and Po*, for the pressure-difference controlling means.

According to the present invention, the pressure control parameters to be used at the pressure-difference controlling means for controlling pressures in the inner zone and the outer zone, respectively, may be predetermined based on the analysis on the composition of off-gas 13 or the gas present in outer zone 5. For example, the pattern of impurity migration between inner zone 4 and outer zone 5 through the sealing means 41a, 41b may be deduced based on the component analysis on off-gas 13 sampled through the gas outlet means 17 or off-gas treating means 34, or that on the gas present in outer zone 5 sampled through an outer zone connecting means 28 or an inert gas connecting means 26b. If off-gas 13 is verified to comprise the constituent of inert gas 12, which is not supplied into the inner zone, the influx of impurity elements from outer zone 5 into inner zone 4 may be decreased or prevented by presetting the value of Pi* higher than that of Po*, i.e., Pi*>Po*. In contrast, if the gas discharged out of outer zone 5 is verified to comprise the constituent of off-gas 13 of inner zone 4 besides that of inert gas 12, the influx of the impurity elements from inner zone 4 into outer zone 5 may be decreased or prevented by presetting the value of Po* higher than that of Pi*, i.e., Po*>Pi*.

As mentioned above, although the sealing means 41a, 41b of reactor tube 2 may not be installed or maintained in a satisfactory manner during the assembly or operation of the fluidized bed reactor, an undesirable migration of impurity components between the two zones through the sealing means may be minimized or prevented by appropriate selection of the control parameters for the pressure controlling means. Here, at whatever values Pi* and Po* may be preset in the pressure-difference controlling means, the requirement of $|Po^*-Pi^*| \leq 1$ bar should be satisfied according to the present invention.

As another example to accomplish the object of the present invention, the pressure difference, i.e., $\Delta P = |Po - Pi|$ may be measured by interconnecting the inner pressure controlling means 30 and the outer pressure controlling means 31, whereby the pressure-difference controlling means may maintain the value of $\Delta P$ within the range of 0 to 1 bar, irrespective of the position of inner zone 4 selected for measurement of Pi, by controlling the inner pressure controlling means 30 and/or the outer pressure controlling means 31 in a manual, semi-automatic or automatic way.

As still another example to accomplish the object of the present invention, the pressure-difference controlling means may comprise an equalizing line, which spatially interconnects a connecting pipe comprised in the inner pressure controlling means 30 and a connecting pipe comprised in the outer pressure controlling means 31. A connecting pipe, which is comprised in the inner pressure controlling means 30 and constitutes the equalizing line 23, may be installed at a position selected for spatial connection with inner zone 4, including but not limited to an inner zone connecting means 24, 25; a fluidizing gas inlet means 14, 14'; a reaction gas inlet means 15; a particle outlet means 16; a gas outlet means 17; or a seed crystals inlet means 18, all of which are spatially exposed to the inner zone in a direct or indirect manner. Meanwhile, a connecting pipe, which is comprised in the outer pressure controlling means 31 and constitutes an equalizing line 23, may be installed at a position selected for spatial connection with outer zone 5, including but not limited to an outer zone connecting means 28 or an inert gas connecting means 26a, 26b, all of which are coupled with the reactor shell and spatially exposed to the outer zone in a direct or indirect manner.

The equalizing line 23, which interconnects spatially the inner pressure controlling means 30 and outer pressure controlling means 31, may be referred to as a simplest form of the pressure-difference controlling means because it may always maintain the pressure difference between two interconnected zones 4, 5 at nearly zero.

Despite this advantage, when constituting the pressure-difference controlling means by the equalizing line 23 alone, gas and impurity components may undesirably be interchanged between two zones 4, 5. In this case, the impurity elements generated or discharged from an insulating material or a heating means installed in outer zone 5 may contaminate the inner zone 4, especially the polycrystalline silicon particles. Likewise, silicon fine powders or components of residual reaction gas or reaction byproduct discharged from the inner zone 4 may contaminate the outer zone 5.

Therefore, when the equalizing line 23 is used as the pressure-difference controlling means, a pressure equalizing means, which can decrease or prevent the possible interexchange of gas and impurity components between two zones 4, 5, may be further added to the equalizing line 23. The pressure equalizing means may comprise at least one means selected from a check valve, a pressure equalizing valve, a 3-way valve, a filter for separating particles, a damping container, a packed bed, a piston, an assistant control fluid, and a pressure compensation device using separation membrane, which, respectively, is able to prevent the possible interexchange of gas and impurity components without deteriorating the effect of pressure equalization.

Besides, the pressure-difference controlling means may comprise a manual valve for controlling pressure or flow rate, or may further comprise a(n) (semi-)automatic valve that performs a(n) (semi-)automatic control function according to a predetermined value of pressure or pressure difference. These valves may be installed in combination with a pressure gauge or a pressure indicator that exhibits a pressure or pressure difference.

The pressure gauge or the pressure indicator is available commercially in the form of either analogue, digital or hybrid device, and may be included in an integrated system of data acquisition, storage and control, if combined with a data processing means such as a signal converter or a signal processor, etc., and/or with a local controller, a distributed controller or a central controller including a circuit for performing an arithmetic operation.

Illustrative embodiments according to the Drawings herein are explained hereinafter in terms of the application of the pressure-difference controlling means for decreasing the pressure difference between inside and outside the reactor tube 2 in the high-pressure fluidized bed reactor for preparing granular polycrystalline silicon.

CODE EXPLANATION OF THE DRAWINGS

| | | | |
|---|---|---|---|
| 1: | Reactor shell | 2: | Reactor tube |
| 3: | silicon particles | 3a: | Silicon seed crystals |
| 3b: | Silicon product particles | 4: | Inner zone |
| 5: | Outer zone | 6: | Insulating material |
| 7: | Liner | 8: | Heater |
| 9: | Electric energy supplying means | 10: | Fluidizing gas |
| 11: | Reaction gas | 12: | Inert gas |
| 13: | Off-gas | 14: | Fluidizing gas inlet means |
| 15: | Reaction gas inlet means | 16: | Particle outlet means |
| 17: | Gas outlet means | 18: | Silicon seed crystals inlet means |
| 19: | Gas distributing means | 23: | Equalizing line |
| 24, 25: | Inner zone connecting means | 26: | Inert gas connecting means |
| 27: | On/off valve | 28: | Outer zone connecting means |
| 30: | Inner pressure controlling means | 31: | Outer pressure controlling means |
| 32: | Pressure-difference gauge | 33: | Fluctuation reducing means |
| 34: | Off-gas treating means | 35: | Gas analyzing means |
| 36: | Filter | 41: | Sealing means |
| E: | Electric source | | |

BEST MODE FOR CARRYING OUT THE INVENTION

The present invention is described more specifically by the following Examples. Examples herein are meant only to illustrate the present invention, but in no way to limit the scope of the claimed invention.

Example 1

Hereunder is provided a description of one embodiment where the inner pressure ($P_i$) and the outer pressure ($P_o$) are independently controlled at predetermined values, $P_i^*$ and $P_o^*$, respectively, and the difference between the values of the inner pressure and the outer pressure is thereby maintained within the range of 0 to 1 bar.

Figure 1:
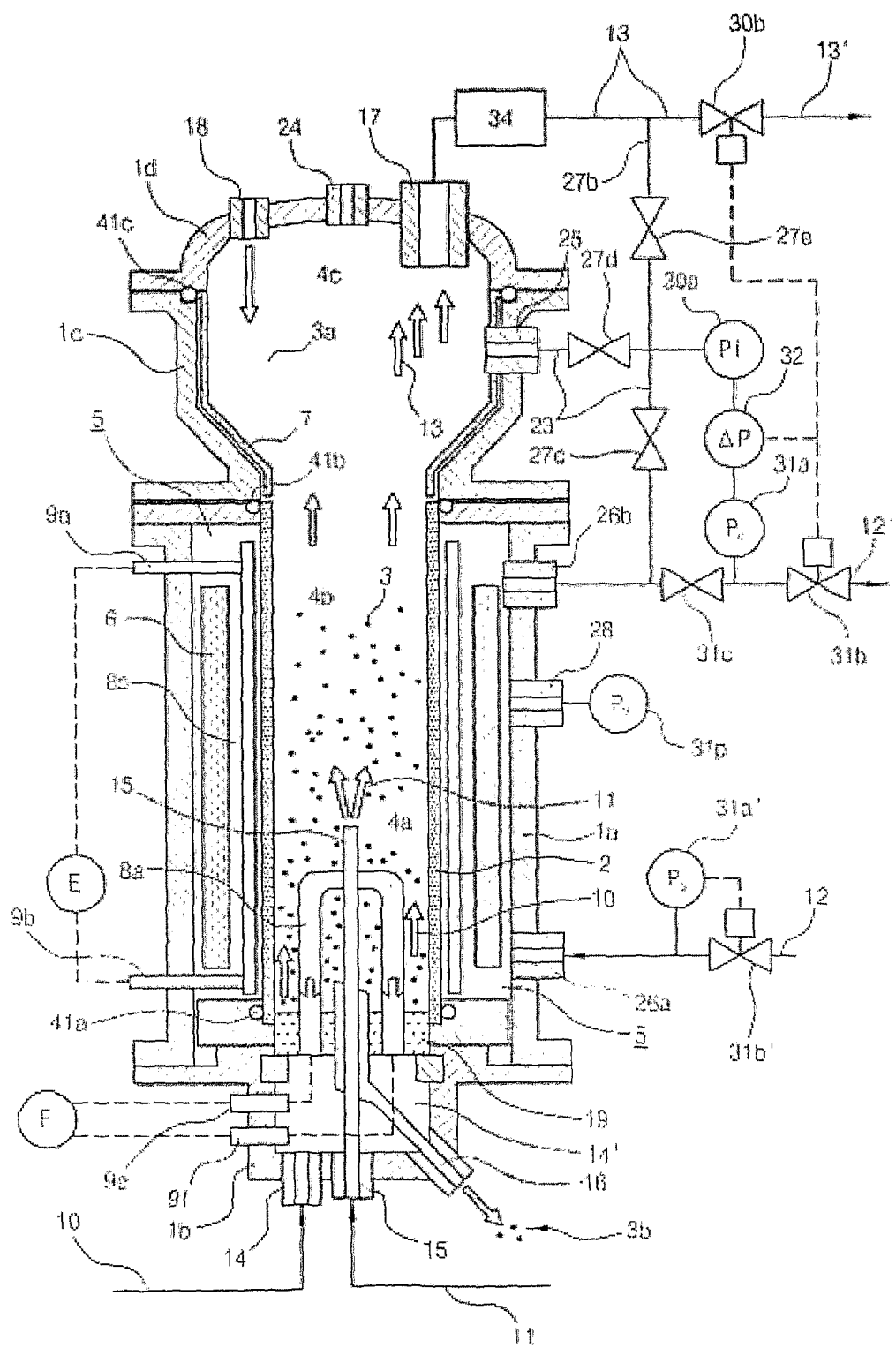
FIG. 1 is a cross-sectional view of a high-pressure fluidized bed reactor for preparing granular polycrystalline silicon, in which several embodiments of the present invention are illustrated in a comprehensive way.
Figure 2:
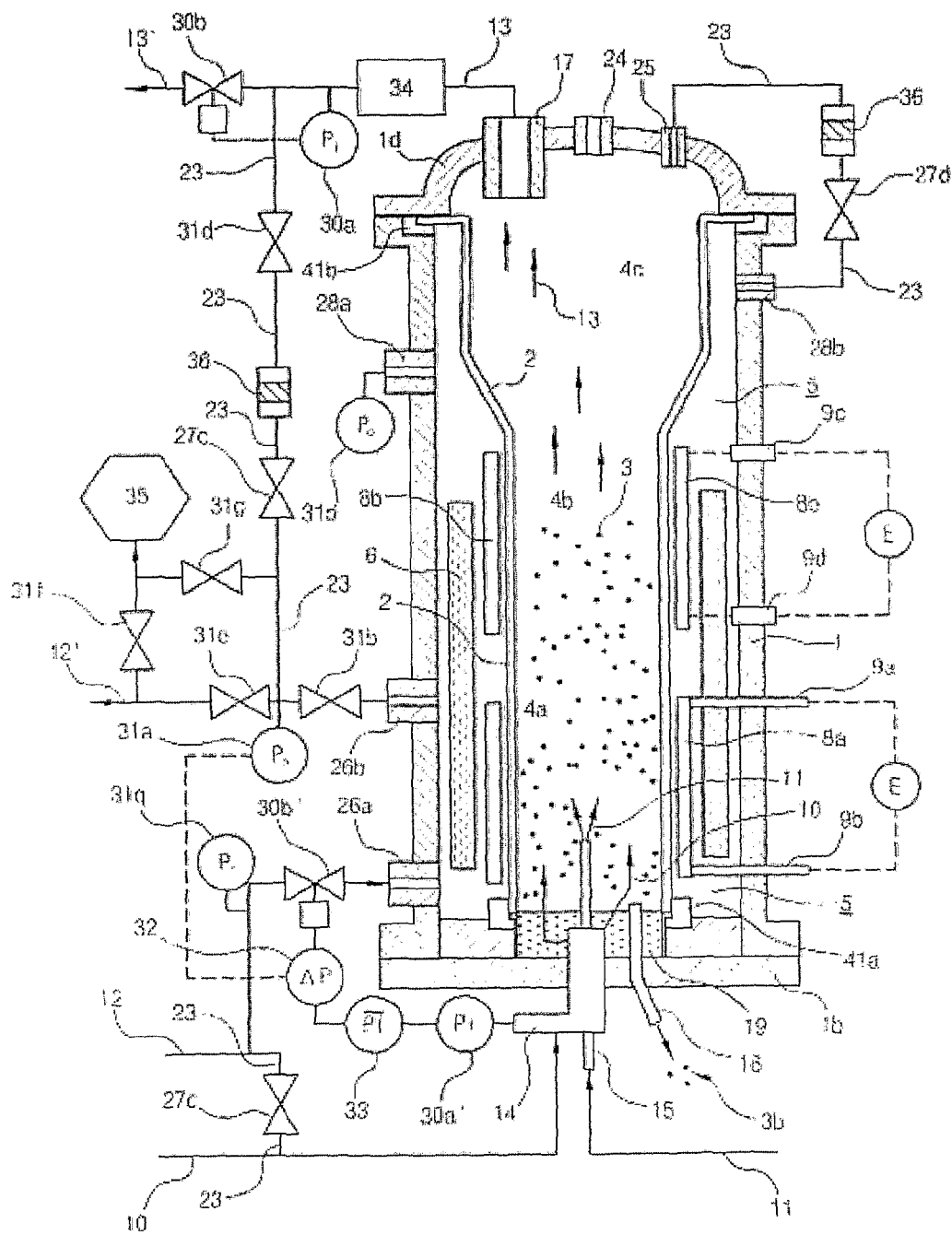
FIG. 2 is a cross-sectional view of a high-pressure fluidized bed reactor for preparing granular polycrystalline silicon, in which some other embodiments according to the present invention are illustrated in a comprehensive way.

As illustrated in FIGS. 1 and 2, an inner pressure controlling means 30 may be constituted by interconnecting a first pressure control valve 30b with a gas outlet means 17 through an off-gas treating means 34 for removing fine silicon particles, which are interconnected with each other by a connecting pipe. The pressure of the upper part of the inner zone 4 may be controlled at a predetermined value, $P_i^*$, by using the first pressure control valve 30b which behaves as an element of a pressure-difference controlling means.

Meanwhile, as illustrated in FIG. 1, an outer pressure controlling means 31 may be constituted by interconnecting an inert gas connecting means 26a, a fourth pressure gauge 31a' and a fourth pressure control valve 31b'. Although being separately installed in FIG. 1, the fourth pressure gauge 31a' and the fourth pressure control valve 31b' may be integrated with each other by a circuit, and thus be constituted as a single device that can measure and control pressure at the same time.

When the inner pressure controlling means 30 is connected to an upper part of the inner zone 4c, the pressure of which is lower than those in or below the fluidized bed, it is preferred to preset $P_i^*$ and $P_o^*$ so that the condition of $P_o^* \geq P_i^*$ may be satisfied.

In this Example, the pressure in the outer zone may be controlled at a predetermined value, Po*, so that the condition of $0\text{ bar} \leqq (Po^*-Pi^*) \leqq 1$ bar may be satisfied, by using the fourth pressure gauge 31a' and the fourth pressure valve 31b' both of which behave as elements of a pressure-difference controlling means.

However, when an inert gas 12 component is detected in the off-gas 13 by a gas analyzing means 35, which may be installed as illustrated in FIG. 2, Po* may be preset at a lower value so that the condition of $Pi^* \geqq Po^*$ may be satisfied.

Meanwhile, the inner pressure controlling means 30 and the outer pressure controlling means 31 may further comprise their own pressure-difference controlling means, respectively, thus enabling the condition of $0\text{ bar} \leqq |Po-Pi| \leqq 1$ bar to be satisfied, where Po and Pi are values of pressure measured in connection with the outer zone 5 and any position in the inner zone 4, respectively.

Example 2

Hereunder is provided a description of another embodiment where the inner pressure (Pi) and the outer pressure (Po) are independently controlled at the predetermined values, Pi* and Po*, respectively, and the difference between the values of the inner pressure and the outer pressure is thereby maintained within the range of 0 to 1 bar.

As illustrated in FIGS. 1 and 2, an inner pressure controlling means 30 may be constituted by interconnecting a first pressure control valve 30b with the gas outlet means 17 through the off-gas treating means 34 for removing fine silicon particles, which are interconnected with each other by a connecting pipe. The pressure of the upper part of the inner zone 4 may be controlled at a predetermined value, Pi*, by using the first pressure control valve 30b which behaves as an element of a pressure-difference controlling means.

Meanwhile, as illustrated in FIG. 1, an outer pressure controlling means 31 may be constituted by interconnecting an inert gas connecting means 26b, an on/off valve 31c, a third pressure gauge 31a and a third pressure control valve 31b. Although being separately installed in FIG. 1, the third pressure gauge 31a and the third pressure control valve 31b may be integrated with each other by a circuit, and thus be constituted as a single device that can measure and control pressure at the same time.

Unlike in Example 1, the supply of an inert gas 12 may be controlled by the third pressure control valve 31b in combination with the Po control, instead of connecting the inert gas connecting means 26a to a pressure-difference controlling means such as the fourth pressure gauge 31a' and the fourth pressure valve 31b'.

When the inner pressure controlling means 30 is connected to an upper part of the inner zone 4c, the pressure of which is lower than those in or below the fluidized bed, it is preferred to preset Pi* and Po* so that the condition of $Po^* \geqq Pi^*$ may be satisfied.

In this Example, the pressure in the outer zone may be controlled at a predetermined value, Po*, so that the condition of $0\text{ bar} \leqq (Po^*-Pi^*) \leqq 1$ bar may be satisfied, by the third pressure gauge 31a and the third pressure control valve 31b both of which behave as elements of a pressure-difference controlling means.

However, when an inert gas 12 component is detected in the off-gas 13 by a gas analyzing means 35, which may be installed as illustrated in FIG. 2, Po* may be preset at a lower value so that the condition of $Pi^* \geqq Po^*$ may be satisfied.

Meanwhile, the inner pressure controlling means 30 and the outer pressure controlling means 31 may further comprise their own pressure-difference controlling means, respectively, thus enabling the condition of $0\text{ bar} \leqq |Po-Pi| \leqq 1$ bar to be satisfied, where Po and Pi are values of pressure measured in connection with the outer zone 5 and any position in the inner zone 4, respectively.

Example 3

Hereunder is provided a description of one embodiment where the inner pressure (Pi) is controlled according to the change of the outer pressure (Po), and the difference between the values of the inner pressure and the outer pressure is thereby maintained within the range of 0 to 1 bar.

As illustrated in FIGS. 1 and 2, a gas outlet means 17, an off-gas treating means 34 for removing fine silicon particles and a first pressure control valve 30b are interconnected with each other by a connecting pipe. Then an inner pressure controlling means 30 may be constituted by interconnecting the connecting pipe with an on/off valve 27e and a pressure-difference gauge 32.

Meanwhile, as illustrated in FIG. 1, an outer pressure controlling means 31 may be constituted by interconnecting an inert gas connecting means 26b and a pressure-difference gauge 32, which are interconnected with each other by the connecting pipe. Here an inert gas 12 may be supplied to the outer zone through an inert gas connection means 26a.

In the present example, the pressure-difference gauge 32 is be a common element for both the inner pressure controlling means 30 and the outer pressure controlling means 31. Besides the pressure control valve 31b, 31b' may be omitted.

When the inner pressure controlling means 30 and the outer pressure controlling means 31 are constituted as described above, the difference between the outer pressure (Po) and the inner pressure (Pi) in upper part of the inner zone can be maintained to be lower than 1 bar independently of the change of the outer pressure (Po) by using the pressure-difference gauge 32 and the first pressure control valve 30b both of which behave as elements of a pressure-difference controlling means.

Further, the inner pressure controlling means 30 may be connected to an upper part of the inner zone 4c, the pressure of which is lower than those in or below the fluidized bed, and it is preferred to control the first pressure control valve 30b so that the condition of $Po \geqq Pi$ may be satisfied.

However, when an inert gas 12 component may be detected in the off-gas 13 by a gas analyzing means 35, which may be installed as illustrated in FIG. 2, the first pressure control valve 30b may be controlled so that the condition of $Pi \geqq Po$ may be satisfied.

Following the aforementioned constitution and operation of the fluidized bed reactor, the condition of $0\text{ bar} \leqq |Po-Pi| \leqq 1$ bar may be satisfied at any position in the inner zone 4.

Meanwhile, the object of the present Example may be accomplished either by automatic control of the integrated circuit of the pressure-difference gauge 32 and the first pressure control valve 30b, or by manual operation of the first pressure control valve 30b in accordance with the values of ΔP measured with the pressure-difference gauge 32.

Instead of the pressure-difference gauge 32, only a first pressure gauge 30a and a third pressure gauge 31a may be installed as the inner pressure controlling means 30 and the outer pressure controlling means 31, respectively. Alternatively, the pressure-difference controlling means may be further corrected or improved by equipping a first pressure gauge 30a and a third pressure gauge 31a in the inner pressure controlling means 30 and the outer pressure controlling means 31, respectively, in addition to the pressure-difference gauge 32.

Example 4

Hereunder is provided a description of another embodiment where the inner pressure (Pi) is controlled according to the change of the outer pressure (Po), and the difference between the values of the inner pressure and the outer pressure is thereby maintained within the range of 0 to 1 bar.

As illustrated in FIGS. 1 and 2, an inner pressure controlling means 30 may be constituted by interconnecting a first pressure control valve 30b with the gas outlet means 17 through the off-gas treating means 34 for removing fine silicon particles, which are interconnected with each other by a connecting pipe.

Meanwhile, as illustrated in FIG. 1, an outer pressure controlling means 31 may be constituted by interconnecting an inert gas connecting means 26a for supplying an inert gas 12 and a fourth pressure gauge 31a', which are interconnected with each other by the connecting pipe. Here, an inert gas 12 may be discharged through an inert gas connection means 26b. Besides the pressure control valve 31b, 31b' in FIG. 1 may be omitted.

When the inner pressure controlling means 30 and the outer pressure controlling means 31 are constituted as described above, the difference between the outer pressure (Po) and the inner pressure (Pi) in the upper part of the inner zone 4c can be maintained to be lower than 1 bar independently of the change of the outer pressure (Po) by using the fourth pressure gauge 31a' and the first pressure control valve 30b both of which behave as elements of a pressure-difference controlling means.

Further, since the inner pressure controlling means 30 may be connected to an upper part of the inner zone 4c, the pressure of which is lower than those in or below the fluidized bed, it is preferred to control the first pressure control valve 30b so that the condition of Po≧Pi may be satisfied.

However, when an inert gas 12 component is detected in an off-gas 13 by a gas analyzing means 35, which may be installed as illustrated in FIG. 2, the first pressure control valve 30b may be controlled so that the condition of Pi≧Po may be satisfied.

Following the aforementioned constitution and operation of the fluidized bed reactor, the condition of 0 bar≦|Po−Pi|≦1 bar may be satisfied at any position in the inner zone 4.

Meanwhile, the object of the present Example may be accomplished either by automatic control of the integrated circuit of the fourth pressure gauge 31a' and the first pressure control valve 30b, or by manual operation of the first pressure control valve 30b in accordance with the pressure value measured with the fourth pressure gauge 31a'.

Instead of connecting a fourth pressure gauge 31a' to the inert gas connecting means 26, the outer pressure controlling means 31 may also be constituted by connecting a fifth pressure gauge 31p to an outer zone connecting means 28 as illustrated in FIG. 1 or a fifth pressure gauge 31p connected to the outer zone connecting means 28a as illustrated in FIG. 2 or a third pressure gauge 31a connected to an inert gas connecting means 26b as illustrated in FIG. 2. Then, the respective pressure gauge employed in the outer pressure controlling means 31 may also behave as another element of the pressure-difference controlling means. Accordingly, the object of the present Example may be accomplished by regulating the first pressure control valve 30b, which behaves as an element of the pressure-difference controlling means that is comprised in the inner pressure controlling means 30, in accordance with the other element of the pressure-difference controlling means that is comprised in a variety of outer pressure controlling means 31.

Example 5

Hereunder is provided a description of one embodiment where the outer pressure (Po) is controlled according to the change of the inner pressure (Pi), and the difference between the values of the inner pressure and the outer pressure is thereby maintained within the range of 0 to 1 bar.

As illustrated in FIGS. 1 and 2, an inner pressure controlling means 30 may be constituted by interconnecting an on/off valve 27d and a pressure-difference gauge 32 with an outer zone connecting means 25 instead of the gas outlet means 17, which are interconnected with each other by a connecting pipe.

Meanwhile, as illustrated in FIG. 1, the outer pressure controlling means 31 may be constituted by interconnecting a third pressure control valve 31b and pressure-difference gauge 32 with an inert gas connecting means 26b, which are interconnected with each other by the connecting pipe. This case corresponds to the case of constitution where the on/off valves 27c, 27e are closed. In the present example, the pressure-difference gauge 32 is a common element for both the inner pressure controlling means 30 and the outer pressure controlling means 31.

When the inner pressure controlling means 30 and the outer pressure controlling means 31 are constituted as described above, the difference between the outer pressure (Po) and the inner pressure (Pi) in the upper part of the inner zone 4c can be maintained to be lower than 1 bar independently of the change of the inner pressure (Pi) by using the pressure-difference gauge 32 and the third pressure control valve 31b both of which behave as elements of a pressure-difference controlling means.

Further, since the inner pressure controlling means 30 may be connected to an upper part of the inner zone 4c the pressure of which is lower than those in or below the fluidized bed, the third pressure control valve 31b may be controlled so that the condition of Po≧Pi may be satisfied.

However, when an inert gas 12 component is detected in an off-gas 13 by a gas analyzing means 35 which may be installed as illustrated in FIG. 2, the first pressure control valve 30b may be controlled so that the condition of Pi≧Po may be satisfied.

Following the aforementioned constitution and operation of the fluidized bed reactor, the condition of 0 bar≦|Po−Pi|≦1 bar may be satisfied at any position in the inner zone 4.

Meanwhile, the object of the present Example may be accomplished either by automatic control of the integrated circuit of the pressure-difference gauge 32 and the third pressure control valve 31b, or by manual operation of the third pressure control valve 31b in accordance with the ΔP value measured with the pressure-difference gauge 32.

Instead of the pressure-difference gauge 32, only a first pressure gauge 30a and a third pressure gauge 31a may be installed as the inner pressure controlling means 30 and the outer pressure controlling means 31, respectively. Alternatively, the pressure-difference controlling means may be further corrected or improved by equipping a first pressure gauge 30a and a third pressure gauge 31a in the inner pressure controlling means 30 and the outer pressure controlling means 31, respectively, in addition to the pressure-difference gauge 32.

The outer pressure controlling means in this Example may be constituted in another form. For example, instead of interconnection of the pressure control valve 31b and pressure-difference gauge 32 with the inert gas connecting means 26b in FIG. 1, the outer pressure controlling means may also be constituted by interconnecting the fourth pressure valve 31b' and the pressure-difference gauge 32 with the inert gas connecting means 26a for supplying the inert gas, which are interconnected with each other by a connecting pipe. If corresponding elements of the pressure-difference controlling means is further replaced together with such modification of the outer pressure controlling means, the object of the present Example may also be accomplished thereby.

Example 6

Hereunder is provided a description of another embodiment where the outer pressure (Po) is controlled according to the change of the inner pressure (Pi), and the difference between the values of the inner pressure and the outer pressure is thereby maintained within the range of 0 to 1 bar.

As illustrated in FIG. 2, the inner pressure controlling means 30 may be constituted by interconnecting a second pressure gauge 30a' and a pressure-difference gauge 32 with a fluidizing gas inlet means 14, which are interconnected with each other by a connecting pipe and/or by electrical integration.

Meanwhile, as illustrated in FIG. 2, the outer pressure controlling means 31 may be constituted by interconnecting a third pressure gauge 31a and a pressure-difference gauge 32, both of which are connected to an inert gas connecting means 26b, with a second pressure control valve 30b' which is connected to an inert gas connecting means 26a. Here, the interconnection may be achieved by the connecting pipe and/or by electrical integration.

In the present example, the pressure-difference gauge 32 is a common element for both the inner pressure controlling means 30 and the outer pressure controlling means 31. The pressure-difference gauge 32 exhibits a physical and/or electrical signal for the difference between Pi and Po, which are measured with the second pressure gauge 30a' and the third pressure gauge 31a, respectively.

A fluctuation reducing means 33 may further be applied to the pressure-difference gauge because the fluidization of silicon particles in the fluidized bed naturally introduces fluctuation in the value of Pi measured by the second pressure gauge 30a'. The fluctuation reducing means 33 may comprise a pressure fluctuation damping (or buffering) means such as a physical device or a software-based device that transforms the fluctuating signals into an average Pi value for a predetermined short period of time (e.g., one second).

Then, by using the pressure-difference gauge 32 and the second pressure control valve 30b' both of which behave as elements of a pressure-difference controlling means, the difference between the outer pressure (Po) and the inner pressure (Pi) is maintained to be lower than 1 bar independently of the change of the inner pressure (Pi) measured through the fluidizing gas inlet means 14 in connection with the inner zone.

Further, since the inner pressure controlling means 30 may be connected to a lower part of the fluidized bed, the pressure of which is higher than that in upper part of the inner zone 4c, the second pressure control valve 30b' may be controlled so that the condition of Po≦Pi may be satisfied.

However, when an off-gas 13 component is detected in an inert gas 12' by a gas analyzing means 35, which may be installed as illustrated in FIG. 2, the second pressure control valve 30b' may be controlled so that the condition of Po≧Pi may be satisfied.

Following the aforementioned constitution and operation of the fluidized bed reactor, the condition of 0 bar≦|Po−Pi|≦1 bar may be satisfied at any position in the inner zone 4.

Meanwhile, the object of the present Example may be accomplished either by automatic control of the integrated circuit of the pressure-difference gauge 32 and the second pressure control valve 30b', or by manual operation of the second pressure control valve 30b' in accordance with the ΔP value measured with the pressure-difference gauge 32.

Further, on behalf of the third pressure gauge 31a in connection with the inert gas connecting means 26b, another outer pressure gauge may be connected to the pressure-difference gauge 32 for achieving the object of the present Example. For example, the outer pressure gauge may also be selected from the fifth pressure gauge 31p in connection with the outer zone connecting means 28a or a sixth pressure gauge 31q in connection with the inert gas connecting means 26a.

Example 7

Hereunder is provided a description of one embodiment where the difference between the values of the inner pressure and the outer pressure is maintained within the range of 0 to 1 bar by using an equalizing line spatially interconnecting the inner zone and the outer zone.

As illustrated in FIG. 1, the equalizing line 23 may be composed of a connecting pipe which spatially interconnects an inner zone connecting means 25 with an inert gas connecting means 26b.

In this case, the inner pressure controlling means 30 may be basically composed of the inner zone connecting means 25 and the connecting pipe, and may further comprise an on/off valve 27d and a first pressure gauge 30a as illustrated in FIG. 1. Meanwhile, the outer pressure controlling means 31 may be basically composed of a connecting means, which is selected among an inert gas connecting means 26a or an outer zone connecting means 28, and the connecting pipe, and may further comprise an on/off valve 31c and a third pressure gauge 31a as illustrated in FIG. 1.

In the present Example, an equalizing line 23 is composed of the two connecting pipes that constitute the inner pressure controlling means 30 and the outer pressure controlling means 31, respectively. Therefore, the equalizing line 23 behaves, by itself, as a pressure-difference controlling means. Spatially interconnecting the upper part of the inner zone 4c with the outer zone 5, the equalizing line 23 naturally prevents an apparent pressure difference between these two zones.

The pressure difference between Pi, measured at a lower part of the fluidized bed 4a where Pi is highest in the bed, and Po, measured at an upper part of the inner zone 4c, is usually below 1 bar. Thus, if the equalizing line 23 is used as the pressure-difference controlling means, the pressure difference between Pi and Po, i.e., between inside and outside of the reactor tube 2 may be maintained below 1 bar irrespective of the measurement point of Pi.

The object of the present Example may also be accomplished by selecting a space in connection with a gas outlet means 17, instead of the inner zone connecting means 25, for constituting the inner pressure controlling means 30.

Meanwhile, the effect of pressure equalization of Pi and Po attributed to the equalizing line 23, which is a pressure-difference controlling means in the present Example, may also be obtained when a pressure equalizing valve 27c is further equipped at the equalizing line 23 enabling spatial partition of the inner zone and the outer zone.

Example 8

Hereunder is provided a description of another embodiment where the difference between the values of the inner pressure and the outer pressure is maintained within the range of 0 to 1 bar by using an equalizing line spatially interconnecting the inner zone and the outer zone As illustrated in FIG. 2, the equalizing line 23 may be composed of a connecting pipe which spatially interconnects an inner zone connecting means 25 and an outer zone connecting means 28b. In this case, the inner pressure controlling means 30 may be basically composed of the inner zone connecting means 25 and the connecting pipe. Meanwhile, the outer pressure controlling means 31 may be basically composed of the outer zone connecting means 28b and the connecting pipe.

In the present Example, an equalizing line 23 is composed of the two connecting pipes that constitute the inner pressure controlling means 30 and the outer pressure controlling means 31, respectively. Therefore, the equalizing line 23 behaves, by itself, as a pressure-difference controlling means. Spatially interconnecting the upper part of the inner zone 4c with the outer zone 5, the equalizing line 23 naturally prevents an apparent pressure difference between these two zones.

The pressure difference between Pi, measured at a lower part of the fluidized bed 4a where Pi is highest in the bed, and Po, measured at an upper part of the inner zone 4c, is usually below 1 bar. Thus, if the equalizing line 23 is used as the pressure-difference controlling means, the pressure difference between Pi and Po, i.e., between inside and outside of the reactor tube 2 may be maintained below 1 bar irrespective of the measurement point of Pi.

Meanwhile, to prevent the migration of impure particles and components through the equalizing line 23, a filter 36 and/or an on/off valve 27d may be further equipped at the equalizing line 23 as illustrated in FIG. 2.

Example 9

Hereunder is provided a description of still another embodiment where the difference between the values of the inner pressure and the outer pressure is maintained within the range of 0 to 1 bar by using an equalizing line spatially interconnecting the inner zone and the outer zone.

As illustrated in FIG. 2, the equalizing line 23 may be composed of a connecting pipe which spatially interconnects a gas outlet means 17 with an inert gas connecting means 26b.

In this case, the inner pressure controlling means 30 may be basically composed of the gas outlet means 17, an off-gas treating means 34 and the connecting pipe, and may further comprise a first pressure gauge 30a, an on/off valve 31d, a filter 36, etc., as illustrated in FIG. 2. Meanwhile, the outer pressure controlling means 31 may be basically composed of a connecting means, which is selected among an inert gas connecting means 26a or an outer zone connecting means 28, and the connecting pipe, and may further comprise an on/off valves 31b, 31e, 31f, 31g, a gas analyzing means 35 and a third pressure gauge 31a, etc., as illustrated in FIG. 2.

In the present Example, an equalizing line 23 is composed of the two connecting pipes that constitute the inner pressure controlling means 30 and the outer pressure controlling means 31, respectively. Therefore, the equalizing line 23 behaves, by itself, as a pressure-difference controlling means. Spatially interconnecting the upper part of the inner zone 4c with the outer zone 5; the equalizing line 23 naturally prevents an apparent pressure difference between these two zones.

The pressure difference between Pi, measured at a lower part of the fluidized bed 4a where Pi is highest in the bed, and Po, measured at an upper part of the inner zone 4c, is usually below 1 bar. Thus, if the equalizing line 23 is used as the pressure-difference controlling means, the pressure difference between Pi and Po, i.e., between inside and outside of the reactor tube 2 may be maintained below 1 bar irrespective of the measurement point of Pi.

The object of the present Example may also be accomplished when a reaction gas inlet means 15 is interconnected with the outer zone 5 by selecting a space in connection with a reaction gas inlet means 15, instead of the gas outlet means 17, for constituting the inner pressure controlling means 30.

Meanwhile, the effect of pressure equalization of Pi and Po attributed to the equalizing line 23, which is a pressure-difference controlling means in the present Example, may also be obtained when a pressure equalizing valve 27c in FIG. 2 is further equipped at the equalizing line 23 enabling spatial partition of the inner zone and the outer zone.

Example 10

Hereunder is provided a description of still another embodiment where the outer pressure (Po) is controlled according to the change of the inner pressure (Pi), and the difference between the values of the inner pressure and the outer pressure is thereby maintained within the range of 0 to 1 bar.

In the present Example, an average value of the inner pressure, Pi(avg), may be estimated from the two values of pressure measured at two spaces which are in spatial connection with a fluidizing gas inlet means 14 and a gas outlet means 17 independently. Then, Po may be controlled according to the estimated value of Pi(avg), thus maintaining the difference between the values of Pi and Po within 1 bar, preferably 0.5 bar.

In the present Example, a second pressure gauge 30a' and a first pressure gauge 30a are installed in connection with a fluidizing gas inlet means 14 and a gas outlet means 17, respectively. The inner pressure controlling means 30 may be constituted as an integrated circuit of a pressure-difference gauge 32 of FIG. 2 and a controller comprising an arithmetic processor, where the controller generates an estimated value of Pi(avg) based on the real-time measurements of the two pressure gauges 30a', 30a. Meanwhile, as illustrated in FIG. 2, an outer pressure controlling means 31 may be constituted as an integrated circuit of the pressure-difference gauge 32 as well as a second pressure control valve 30b' and a third pressure gauge 31a which are connected to an inert gas connecting means 26a and an inert gas connecting means 26b, respectively. Here, the pressure-difference gauge 32 exhibits the difference between Pi(avg) and Po, and generates an electric signal corresponding to the difference, thus operating the second pressure control valve 30b'. Therefore, being a common element for both the inner pressure controlling means 30 and the outer pressure controlling means 31, the software-based function of the pressure-difference gauge 32 may be coupled into the controller for estimation of Pi(avg).

Because the value of Pi measured by the second pressure gauge 30a' fluctuates depending on the fluidization state of the fluidized bed, the controller comprising an arithmetic processor for estimation of Pi(avg) may further comprise a software-based damping means that generates time-averaged values of pressure, Pi*(avg), at an interval of, for example, 10 seconds or 1 minute based on the fluctuating real-time values of Pi. This damping means may allow a smooth operation of the second pressure control valve 30b' based on the time-averaged value instead of the fluctuating Pi.

Using the controller comprising an arithmetic processor and the second pressure control valve 30b' as a pressure-difference controlling means, it is possible to control the outer pressure (Po) according to the change of the time-average of Pi values measured at different positions in connection with the inner zone, and then to maintain the difference of Po from and Pi(avg) or Pi*(avg) within the range of 0 to 1 bar.

The manipulation of the second pressure control valve 30b' for controlling the outer pressure according to the average value of the inner pressure may be adjusted following a gas-component analysis on the off-gas through a gas outlet means 17 or the off-gas treating means 34 and/or on the gas discharged from the outer zone through the outer zone connecting means 28 or an inert gas connecting means 26b. If a large amount of an inert gas component is detected in the off-gas, it is preferred to lower Po, thus decreasing the migration of impurity into the inner zone 4 from the outer zone 5. On the contrary, if an off-gas 13 component is detected in the gas from the outer zone besides an inert gas 12, it is preferred to raise Po, thus decreasing the migration of impurity into the outer zone 5 from the inner zone 4. Nonetheless, according to the present Example, the condition of $|Po-Pi^*(avg)| \leq 1$ bar should be satisfied irrespective of conditions for controlling Po. If the impurity component is not detected, it is preferred to manipulate the second pressure control valve 30b' so that Po may be substantially the same with Pi*(avg). Therefore, it is possible to minimize or prevent the undesirable migration of impurity by controlling the pressure difference between the inner zone 4 and the outer zone 5, although the sealing means 41a, 41b for reactor tube 2 are not maintained perfect during the operation of the fluidized bed reactor.

The object of the present Example may also be accomplished by constituting the outer pressure controlling means 31 in a different way. For example, instead of the third pressure gauge 31a connected to the inert gas connecting means 26b, a fifth pressure gauge 31p or a sixth pressure gauge 31q, which are connected to an outer zone connecting means 28a or an inert gas connecting means 26a, respectively, to may be selected as the pressure gauge to be connected to the pressure-difference gauge 32. Further, instead of the second pressure control valve 30b' connected to the inert gas connecting means 26a, a third pressure control valve 31b connected to the inert gas connecting means 26b may be selected as the pressure control valve.

Meanwhile, the object of the present Example may also be accomplished by constituting the inner pressure controlling means 30 in a different way. For example, instead of the second pressure gauge 30a' connected to the fluidizing gas inlet means 14, a pressure gauge in spatial connection with a silicon product particle outlet means 16 may be selected for measurement of Pi(avg) together with the first pressure gauge 30a connected to the gas outlet means 17.

Besides the aforementioned Examples, the inner pressure controlling means 30, the outer pressure controlling means 31 and the pressure-difference controlling means may be constituted in a variety of manners for preparation of granular polycrystalline silicon according to the present invention.

As set forth above, the high-pressure fluidized bed reactor for preparing granular polycrystalline silicon herein have the superiority as follows.

1. The pressure difference between both sides of the reactor tube is maintained so low that a high-pressure silicon deposition is possible without deteriorating the physical stability of the reactor tube, thus enabling to fundamentally prevent the damage of the reactor tube due to the pressure difference, and to increase long-term stability of the reactor.

2. The silicon deposition reaction may be performed even at high pressure, thus enabling to remarkably increase the production yield of polycrystalline silicon per fluidized bed reactor.

3. It is possible to lower the cost for preparing the reactor tube because the material or thickness of the reactor tube may be determined without being affected by pressure.

4. The difference between the inner and the outer pressure may be maintained within a predetermined range at a relatively low cost without continuously providing a large amount of inert gas into the outer zone of the reactor.

5. The outer zone of the reactor is maintained under an inert gas atmosphere and the inert gas may be discharged through a separate exit. Thus, although an insulating material and optionally a heater are installed in the outer zone and the outer zone may comprise additional partitioning means in a radial or vertical direction, it is possible to decrease remarkably the possibility that impurity from these components can migrate into the inner zone and deteriorate the quality of polycrystalline silicon product.

6. The long-term stability of the reactor may be increased remarkably because any thermal degradation in terms of chemical and physical properties of those additional components in the outer zone is less probable under the inert gas atmosphere.

7. Even in case the components of fluidizing gas, reaction gas or off-gas, or fine silicon particles happen to migrate into the outer zone from the inner zone, they may be easily removed therefrom by the inert gas introduced into the outer zone, thus enabling to prevent an interruption of operation due to contamination in the outer zone.

What is claimed is:

1. A high-pressure fluidized bed reactor for preparing granular polycrystalline silicon, comprising:
   (a) a reactor tube;
   (b) a reactor shell encompassing the reactor tube;
   (c) an inner zone formed within the reactor tube and an outer zone formed in between the reactor shell and the reactor tube, wherein a silicon particle bed is formed and silicon deposition occurs in the inner zone while a silicon particle bed is not formed and silicon deposition does not occur in the outer zone;
   (d) an inlet means for introducing gases into the silicon particle bed;
   (e) an outlet means comprising a silicon particle outlet means and a gas outlet means for discharging the polycrystalline silicon particles and off-gas out of the silicon particle bed, respectively;
   (f) an inert gas connecting means for maintaining a substantially inert gas atmosphere in the outer zone;
   (g) a pressure controlling means for measuring and/or controlling the inner zone pressure (Pi) or the outer zone pressure (Po); and
   (h) a pressure-difference controlling means for maintaining the value of $|Po-Pi|$ within the range of 0 to 1 bar.

2. The reactor of claim 1, wherein the inlet means comprises a fluidizing gas inlet means for introducing a fluidizing gas to the silicon particle bed and a reaction gas inlet means for introducing a silicon atom-containing reaction gas to the silicon particle bed.

3. The reactor of claim 1, wherein the outlet means comprises a silicon particle outlet means for discharging polycrystalline silicon particles formed in the inner zone out of the fluidized bed reactor and a gas outlet means for discharging off-gas including a fluidizing gas, a non-reacted reaction gas and a byproduct gas.

4. The reactor of claim 1, wherein the pressure controlling means comprises an inner pressure controlling means which is spatially connected to the inner zone through at least one means selected from the group consisting of an inner zone connecting means, a fluidizing gas inlet means, a reaction gas inlet means, a silicon particle outlet means and a gas outlet means, which are spatially exposed to the inner zone.

5. The reactor of claim 1, wherein the pressure controlling means comprises an outer pressure controlling means which is spatially connected to the outer zone through at least one means selected from the group consisting of an outer zone connecting means and an inert gas connecting means, which are installed on or through the reactor shell 1 and spatially exposed directly or indirectly to the outer zone 5.

6. The reactor of claim 1, wherein the inert gas is at least one gas selected from the group consisting of hydrogen, nitrogen, argon and helium.

7. The reactor of claim 1, wherein the reactor tube is made of at least one material selected from the group consisting of quartz, silica, silicon nitride, boron nitride, silicon carbide, graphite, silicon, and glassy carbon.

8. The reactor of claim 7, wherein the reactor tube is of one-layered or multi-layered structure in the thickness direction, each layer of which is made of a different material.

9. The reactor of claim 1, wherein at least one heating means is installed in the inner zone and/or the outer zone.

10. The reactor of claim 9, wherein the heating means is electrically connected to an electric energy supplying means installed on or through the reactor shell.

11. The reactor of claim 1, wherein the heating means is installed within the silicon particle bed.

12. The reactor of claim 11, wherein the heating means is positioned lower than a reaction gas inlet means for introducing a reaction gas to into the silicon particle bed.

13. The reactor of claim 1, wherein the pressure controlling means comprises the pressure-difference controlling means.

14. The reactor of claim 1, wherein the inner zone pressure and the outer zone pressure are in the range of 1-15 bar, respectively.

15. The reactor of claim 14, wherein the outer zone pressure may be controlled in the range of between maximum and minimum pressure values measurable in the inner zone.

16. The reactor of claim 1, wherein the pressure controlling means includes at least one component selected from the group consisting of:
   (a) a connecting pipe or fitting for spatial connection;
   (b) a manually-operated, semi-automatic, or automatic valve;
   (c) a digital or analog pressure gauge or pressure-difference gauge;
   (d) a pressure indicator or recorder; and
   (e) an element constituting a controller with a signal converter or an arithmetic processor.

17. The reactor of claim 1, wherein the pressure controlling means for the inner pressure is interconnected with the pressure controlling means for the outer pressure in the form of a mechanical assembly or a signal circuit.

18. The reactor of claim 17, wherein the pressure controlling means is partially or completely integrated with a control system selected from the group consisting of a central control system, a distributed control system and a local control system.

19. The reactor of claim 17, wherein the pressure controlling means is partially or completely integrated with a means for measuring or controlling a parameter selected from the group consisting of flow rate, temperature, gas component and particle concentration.

20. The reactor of claim 17, wherein the pressure controlling means comprises a filter or a scrubber for separating particles, or a container for buffering pressure.

21. The reactor of claim 1, wherein the pressure-difference controlling means comprises at least one selected from the group consisting of a connecting pipe, a manually-operated valve, an automatic valve, a pressure gauge, a pressure indicator, a signal converter, a controller with an arithmetic processor and a filter for separating particles.

22. The reactor of claim 1, wherein the inner pressure controlling means and the outer pressure controlling means comprise respective pressure-difference controlling means so that the inner pressure (Pi) at the inner zone and the outer pressure (Po) at the outer zone be controlled at predetermined values of pressure, Pi* and Po*, respectively, satisfying the requirement of $|Po^* - Pi^*| \leq 1$ bar.

23. The reactor of claim 1 or 13, wherein the pressure difference, $\Delta P = |Po - Pi|$, is measured by interconnecting the inner pressure controlling means and the outer pressure controlling means, whereby the pressure-difference controlling means maintains the value of $\Delta P$ within the range of 0 to 1 bar by controlling the inner pressure controlling means and/or the outer pressure controlling means in a manual, semi-automatic or automatic way.

24. The reactor of claim 1, the pressure-difference controlling means comprises an equalizing line that spatially interconnects a first connecting pipe and a second connecting pipe, which are comprised in the inner pressure controlling means and the outer pressure controlling means, respectively.

25. The reactor of claim 24, wherein the equalizing line comprises at least one selected from the group consisting of a check valve, a pressure equalizing valve, a 3-way valve, a filter for separating particles, a damping container, a packed bed, a piston, an assistant control fluid and a pressure compensation device using separation membrane.

* * * * *